(12) United States Patent  
Tour et al.

(10) Patent No.: US 6,259,277 B1  
(45) Date of Patent: Jul. 10, 2001

(54) USE OF MOLECULAR ELECTROSTATIC POTENTIAL TO PROCESS ELECTRONIC SIGNALS

(75) Inventors: James M. Tour, Bellaire, TX (US); Jorge M. Seminario, Columbia, SC (US); Masatoshi Kozaki, Osaka (JP)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 09/360,814

(22) Filed: Jul. 26, 1999

Related U.S. Application Data

(60) Provisional application No. 60/094,277, filed on Jul. 27, 1998.

(51) Int. Cl.[7] ............................................ H03K 4/90

(52) U.S. Cl. ................................. 326/136; 326/104

(58) Field of Search .................................. 326/136, 104

(56) References Cited

U.S. PATENT DOCUMENTS 6,091,267 * 7/2000 Palm et al. ........................ 326/136

OTHER PUBLICATIONS

A. Görling et al, "Hybrid schemes combining the Hartree–Fock method and density–functional theory: Underlying formalism and properties of correlation functionals", *Journal of Chemical Physics*, vol. 106, pp. 2675–2680 (1997).

A.D. Becke, "A new mixing of Gartree–Fock and local density–functional theories", *Journal of Chemical Physics*, vol. 98, pp. 1372–1377 (1993).

J.P. Perdew et al., "Atoms, molecules, solids, and surfaces: Applications of the generalized gradient approximation for exchange and correlation", *Physical Review B*, vol. 46, No. 11, pp. 6671–6687.

J.P. Perdew et al., "Accurate and simple analytic representation of the electron–gas correlation energy", *Physical Review B*, vol. 45, No. 23, pp. 13244–13249 (1992).

M.J. Frisch et al, *Gaussian 94 User's Reference*, E.1 version, Gaussian, Inc. Pittsburgh, PA (1996).

J.B. Foresman, "Exploring Chemistry with Electronic Structure Methods", *Gaussian, Inc*. Pittsburgh, PA (1996).

E. Scrocco et al, "The Electrostatic Molecular Potential as a Tool for the Interpretation of Molecular Properties", *Topics in Current Chemistry*, vol. 42, pp. 95–170 (1973).

(List continued on next page.)

*Primary Examiner*—Trong Phan  
(74) *Attorney, Agent, or Firm*—Benman & Collins (57) ABSTRACT

The present invention is a design paradigm for molecular scale electronic systems wherein electronic information is transmitted and processed, and electronic logic is obtained by changing the electrostatic potential of a molecule. The signal may be restored using an external potential through the underlying substrate. Several convergent synthetic routes are shown to conjugated molecules with various potential electronic device applications including a two-terminal molecular wire with a transport barrier, a molecular wire with two transport barriers, three-terminal junctions, three-terminal structures with switch-like possibilities, and four-terminal systems that could serve as logical gates without the use of multiple transistors. Ab initio computational methods are used to show that (i) molecules can be considered active electronic devices able to transfer the information from one molecule to another, (ii) the electrostatic potential can also be used as a tool to perform logical operations, and (iii) that the molecules synthesized here could perform the functions for which they were designed.

25 Claims, 10 Drawing Sheets

OTHER PUBLICATIONS

P. Politzer et al., , eds., "Molecular Electrostatic Potentials", *Elsevier, Inc.*, vol. 3, pp. 649–660 (1996).

C.S. Lent et al, "A Device Architecture for Computing with Quantum Dots", *Proceedings of IEEE*, vol. 85, No. 4, pp. 541–557 (1997).

J.M. Tour et al, "Self–Assembled Monolayers and Multi-layers of Conjugated thiols, α, ω–Dithiols, and Thioacetyl–Containing Adsorbates. Understanding Attachments between Potential Molecular Wires and Gold Surfaces", *Journal of the American Chemical Society*, vol. 117, pp. 9529–9534, (1995).

D.L. Pearson et al, "Rapid Syntheses of Oligo(2, 5–thiophene ethynylene)s with Thioester Termini: Potential Molecular Scale Wires with Alligator Clips", *Journal of Organic Chemistry*, vol. 62, No. 5, pp. 1376–1387 (1997).

J.M. Seminario, ed., Elsevier, "Recent Developments and Applications of Modern Density Functional Theory", *Theoretical and Computational chemistry*, vol. 4 (1996).

J.M. Tour et al, "Molecular Scale Electronics: A Synthetic/Computational Approach to Digital Computing", *Journal of the American Chemical Society*, vol. 120, No. 33, pp. 8486–8493 (1998).

L. Jones et al, "Rapid Solution and Solid Phase Syntheses of Oligo(1,4–phenylene ethynylene)s with Thioester Termini: Molecular Scale Wires with Alligator Clips. Derivation of Iterative Reaction Efficiencies on a Polymer Support", *Journal of Organic Chemistry*, vol. 62, pp. 1288–1410 (1997).

L. Bumm et al, "Are Single Molecular Wires Conducting?", *Science*, vol. 271, pp. 1705–1707 (1996).

G.W. Gribble et al, [1.1.1.1.1] Paracyclophane and [1.1.1.1.1.1] Paracyclophane, *Tetrahedron Letters*, vol. 26, No. 49, pp. 6023–6026 (1985).

* cited by examiner

FIG. 1

TABLE 1

| CHEMICAL SYMBOL | MOLECULAR CIRCUIT SYMBOL | DESCRIPTION |
|---|---|---|
| - SAc | •—— | CONTACT TO INPUT OR OUTPUT |
| - $CH_2$ - | ⟨⊓⟩ | TRANSPORT BARRIER |
| (1,3,5-trisubstituted benzene) | (1,3,5-trisubstituted benzene) | 1, 3, 5 - TRISUBSTITUTED BENZENE OR T-JUNCTION |
| (1,2,4,5-tetrasubstituted benzene) | (1,2,4,5-tetrasubstituted benzene) | 1, 2, 4, 5 - TETRASUBSTITUTED BENZENE OR Q-JUNCTION |
| -⟨⟩- | -[ P (1,0) ]- | 1, 4 - DISUBSTITUTED BENZENE |
| -⟨⟩-≡-⟨⟩- | -[ P (2,1) ]- | 1, 4 - (PHENYLENE ETHYNYLENE) - 1, 4 - PHENYLENE |
| -⟨⟩-≡-⟨⟩-≡- | -[ P (2,2) ]- | 1, 4 - (PHENYLENE ETHYNYLENE) - 1, 4 - (PHENYLENE ETHYNYLENE) |
| -⟨⟩-≡-⟨⟩-≡-⟨⟩- | -[ P (3,2) ]- | 1, 4 - (PHENYLENE ETHYNYLENE) - 1, 4 - (PHENYLENE ETHYNYLENE) - 1, 4 - PHENYLENE |

IF $V_{in}$ = L THEN $Z_{out}$ = H (~2P)
IF $V_{in}$ = H THEN $Z_{out}$ = L ($Z_{out}$ ~3P/2)

| $V_{in}$ | $Z_{out}$ |
|---|---|
| LOW POTENTIAL | HIGH IMPEDANCE |
| HIGH POTENTIAL | LOW IMPEDANCE |

IF $V_{1,in}$ = L AND $V_{2,in}$ = L
THEN $V_{out}$ = L AND $Z_{out}$ ~2P

IF THE OUTPUT IS ACTIVE (AS A POTENTIAL)

| $V_{1,in}$ | $V_{2,in}$ | $V_{out}$ |
|---|---|---|
| L | L | L |
| L | H | H |
| H | L | H |
| H | H | H |

OR (AND IF NEGATIVE LOGIC IS USED)

FIG. 8

IF $V_{1,in}$ = L AND $V_{2,in}$ = H
THEN $V_{out}$ = H AND $Z_{out}$ ~(4/3)P

IF $V_{1,in}$ = H AND $V_{2,in}$ = H
THEN $V_{out}$ = H AND $Z_{out}$ ~(4/3)P

IF THE OUTPUT IS PASSIVE (AS AN IMPEDANCE)

| $V_{1,in}$ | $V_{2,in}$ | $Z_{out}$ |
|---|---|---|
| L | L | H |
| L | H | L |
| H | L | L |
| H | H | L |

NOR (NAND IF NEGATIVE LOGIC IS USED)

USE OF MOLECULAR ELECTROSTATIC POTENTIAL TO PROCESS ELECTRONIC SIGNALS

CROSS-REFERENCE TO RELATED APPLICATION

The present application is a non-provisional application, and claims priority based on provisional application, Ser. No. 60/094,277, filed on Jul. 27, 1998.

The present invention was made with United States Government support under Contract Nos. N00014-97-1-0806 and N00014-95-1-1182 awarded by the Defense Advanced Research Projects Agency and the Office of Naval Research. The U.S. Government has certain rights in this invention.

FIELD OF THE INVENTION

The present invention relates to computer design. In particular, the present invention relates to the use of molecules as electrical circuit elements for transmitting and processing signals on molecules that are used as electronic logic elements.

BACKGROUND OF THE INVENTION

The routine feature size of microchips has dramatically declined to ~0.1 $\mu$m. Although a further decrease is likely, once the line size on integrated circuits becomes <0.01 $\mu$m, several quantum limitations will likely curtail the proper performance of solid state devices which use electron currents as signal representations. New technological schemes will need to be developed for use at these small dimensions.

Molecular scale electronics is a field of study that proposes the use of single molecules to function as the key components in future computational devices. In particular, single molecules that have strategically placed charge barriers could serve as switches and logic devices.

Typical molecular-sized systems would permit the use of ~$10^{13}$ logic gates per cm$^2$ compared to the present feature of a microchip, less than $10^8$ gates per cm$^2$, thereby offering a $10^5$ decrease in required size dimensions. In addition to substantial size reductions, the response times of molecular devices can be in the range of femto-seconds while the fastest present devices operate in the nanosecond regime. Thus a $10^6$ increase in speed may be attainable. Although numerous obstacles remain, a combined $10^{11}$ increase in computing performance offers an exciting impetus to consider molecular scale electronic architectures for future ultracomputing.

Present electronic digital devices are governed by considerations of size and speed. Optimizing the size of the basic units (usually the transistors) and their speed (limited by their natural temporal responses) are conflicting design goals. Therefore several trade-offs have to be made. The most important compromise in computational technology is the hardware-software duality, which materializes in the requirements of a programmed logic (memory- or software-dominant) versus wired logic (CPU-, or hardware-dominant). Components of programmed logic are smaller and able to handle larger problems than a wired logic system; however, a wired-logic is faster than a programmed-logic. At one extreme there can be a bit adder (a minimum logic unit able to sum) with a small number of logical gates that will require a large memory to obtain the results, while at the other extreme, there could be a large CPU with all specific functions wired into the system that will be able to process the entire problem, having only a small memory for the input and output data. Present technology is heavily inclined toward programmed logic, for example, a computer with a large memory and a fast but simple CPU. This requires very large programs to solve present problems.

A classical two-terminal semiconductor device is characterized by the ability to conduct charges (electrons or holes) with low impedance in one direction and high impedance in the reverse direction. The simplest of these two-terminal devices is a diode where a p-type semiconductor is joined to an n-type semiconductor (p-n junction). Therefore, an electrical potential applied from one direction will deplete the junction and will not allow a current to pass, while a potential applied in the opposite direction will allow the crossing of charged carriers. A more advanced device is a transistor where an additional collector, p- or n-type semiconductor, is joined to the n- or p- side of the diode, or base, respectively. The main feature of this device is that a small current in the base is able to control a large current in the collector or emitter. This notable amplification can also be viewed as a device having a low input impedance and a high output impedance. A parallel device which can be made even smaller than the bipolar transistor is the field effect transistor (FET). It is similar to the transistor but the output current is controlled by an input voltage rather than an input current. It has a three terminal arrangement: gate, source and drain corresponding to the base, emitter and collector, respectively, of the bipolar transistor.

These three-terminal electronic devices can be classified as amplifiers and switches. Normally good amplifiers are also good switches, but the opposite is not necessarily true. When the transistor is used as an amplifier, the goal is to increase the power (energy per unit of time) of an input signal. If the device has a small input resistance, it will have a small input power, and if it has a large output resistance, it will have a large output power. The power of the signal is amplified at the expense of a power supply, thus an amplifier shapes the energy of a power supply according to the shape of a small input signal. Since the output must sustain a large amount of energy under amplification conditions, the use of single molecules as amplifiers is discouraged and is therefore not being considered within the paradigm described here. However, the other application of transistors is their use as digital systems for processing of information, such as in digital computers. This is the area where single molecules can be used with possibilities of making computers orders of magnitude more efficient.

In bulk electronics, it is a simple task to convert a good amplifier to a switch in which a small signal controls the passage of current; therefore the logic is based on whether or not the current passed. A large output current provides the circuit with a capable fan out, namely the ability to drive subsequent circuits in a cascade with high reliability. Logical circuits, in addition to performing the logical operations, also need to have a good driving capability. The output of a gate needs to be powerful enough to excite the input of one or more subsequent gates. At the same time, this high output should not couple to the input of the same device. This implies that there must be a very high impedance between the input and output. These are problems that would limit the use of molecular devices if bulk device architectural philosophies are applied. The energy of a power supply could not be shaped using a single molecule.

The eventual limitation to downscaling of conventional devices will be brought about by a combination of difficulties in fabrication, reliability, yield, interconnects, economics of production, and ultimately fundamental limits. In this size regime, several fundamental properties of quantum systems have to be considered such as superposition, interference, entanglement, non-clonability and uncertainty. Therefore, extension of microelectronics beyond current size regimes requires exploration of non-conventional electronic structures which scale far beyond these limits.

Since conventional devices would be difficult to downsize, novel approaches to logic circuit design have to be devised wherein transistors and integrated circuits are substituted by using simple molecular structures. Of course, this implies the consideration of non-standard architectures and design philosophies. Entirely new logic architectures would be required from molecular based electronic components which will be complementary yet non-identical to their bulk counterparts. Hence, molecules that work like the basic electronic devices (transistors, diodes etc.) may not be desired, except for purely testing purposes. However, as we consider novel designs, we should not discard some basic principles that underpin CPU construction. For example, proposals in molecular scale electronics must regard the need for input/output signal homogeneity within devices. An electronic input and a photonic output (or vise versa) within a device would be difficult to consider since the second device in the series would then require photonic operation. We must maintain a homogeneity of input and output signal types (e.g. voltage in and voltage out) and magnitudes within a device so that the second device can be driven with the same signal type and signal size that operated the first device. Therefore, new architectural strategies must be proposed while considering fundamental needs of overall CPU operation.

If devices were to be based upon single molecules, using routine chemical syntheses, one could prepare $6 \times 10^{23}$ (Avogadro's number) devices in a single reaction flask, hence, more devices than are presently in use by all the computational systems combined, world-wide. Thus, molecular scale electronics would likely shift the software/hardware equilibrium in the direction of hardware, namely, massively wired logic or CPU dominant. Molecular circuits offer the possibility of constructing large and fast CPUs with complicated functions. Using large molecular arrays, problems could be calculated within the CPU with minimal need for main or auxiliary memories. Wired-logic would supplant much of the programmed-logic, thereby affording several additional orders of magnitude increase in performance.

A major consideration in molecular devices is the energy consumption/dissipation needs. Transfer of large numbers of electrons or electron currents would lead to excessive heat problems with molecular scale devices, and such a strategy may only be useful for testing purposes. Considering $10^8$ gates/cm$^2$ (as in presently-sized silicon-based systems) at the rate of $10^{-9}$ sec (present speeds) yields $10^{17}$ electrons/sec (~0.02 amperes/cm$^2$) if only one electron per gate is used to transport, indicate, fetch, or represent a binary digit. At this point heat considerations are already extreme: if the average resistance of the circuit is $30\Omega$, this represents 20 watts/cm$^2$. If an increase of several orders of magnitude in performance is expected with molecular circuits, this would imply a proportional increase in power dissipation. Such levels of power dissipation rule out most conventional current or electron transfer methods for practical molecular devices wherein large numbers of devices are densely configured.

In spite of these and other hurdles, the enormity of Avogadro's number, the richness of molecular structures available, and the physical advantages of using systems in a quantized regime make the prospects of molecular scale electronics eminently attractive for the next generation of ultracomputing. Thus, there is a keen interest and need for digital electronic circuit elements at the molecular scale.

SUMMARY OF THE INVENTION

According to its preferred aspects and briefly described, molecular devices would function by electrostatic interactions produced by small reshaping of the electron density due to the input signals. Changes in electrostatic potential would represent the information throughout the molecular-based CPU or molecular circuit. Using this approach, there is no need for electron currents or large electron transfers as in present devices; a small change in the electrostatic potential of one molecule could be enough to send the information to another molecule. These perturbations of the electrostatic potential imply a very small amount of equivalent charge transfer, far less than one electron.

Thus, in accordance with the present invention, molecular devices are provided, each such device comprising at least one internal molecular unit for performing logic functions. The molecular devices have at least one input as well as at least one output, both the input(s) and output(s) being connected to the internal molecular unit(s). The logic functions are performed using molecular electrostatic potentials and are based on perturbing the charge distribution of a first molecule which can feed, in series or parallel, one or more preselected and prearranged molecules (called a molecular circuit), whereby the electrostatic potentials of each preselected molecule in the series of preselected and prearranged molecules is perturbed by the perturbation of the neighboring molecule's electrostatic potential.

By "preselected" is meant that specific molecules are deliberately selected or chosen to be added to the system. By "prearranged" is meant that the molecules may either be covalently bound to each other or within a proper distance to undergo an electrostatic potential change from surrounding neighbors.

Further in accordance with the invention, a method is provided for transporting signals and information using molecular electrostatic potential. The method comprises the steps of:

(a) perturbing the electrostatic potential of a first molecule in a series of preselected and prearranged molecules, whereby the electrostatic potentials of each preselected molecule in the series of preselected and prearranged molecules is perturbed by the perturbation of the neighboring molecule's electrostatic potential; and (b) detecting the perturbation of the electrostatic potential of the last molecule in the series of molecules or the broader molecular circuit.

The use of molecules as circuit elements has a number of advantages. The most obvious one is small size. However, there are others. These include lower manufacturing costs and greater uniformity than is achievable with solid state semiconductor devices.

The use of molecular scale central processing units also substantially eliminates the problem of present semiconductor-based technology of working at very high frequencies. Small spurious capacitances (C) usually appear between portions of devices and circuits that otherwise should be totally electrically disconnected, or at infinite impedance (Z). If the operational frequency of the device increases, the impedance would decrease proportionally with the frequency (f) of operation ($Z=\frac{1}{2}\pi fC$) rendering the device useless after a characteristic cutoff frequency. This cutoff frequency constitutes an upper limit to the operational frequency which, in present technology, approaches 1 GHz (which corresponds to a 1 ns clock time). Since the capacitance is also inversely dependent on the distance, making smaller circuits yields larger spurious capacitances, and therefore smaller impedances, exacerbating the move toward smaller devices. Furthermore, since electrostatic potentials are only limited by the time in which the electron density rearranges in a molecule (<1 fs) and they do not imply a net transfer of electrons, they can lead to the high interdevice impedance levels required.

These and other features and advantages of the present invention will be apparent to those skilled in the art of computer circuit design from a careful reading of the De tailed Description of Preferred Embodiments accompanied by the following drawings.

DETAILED DESCRIPTION OF PREFERRED EMBODIMENTS

Reference is now made in detail to a specific embodiment of the present invention, which illustrates the best mode presently contemplated by the inventors for practicing the invention. Alternative embodiments are also briefly described as applicable.

External fields or excitations are able to change the boundary conditions of the molecule producing a change in the electrostatic potential generated by these sources. An example of this can be seen in FIG. 1. A charge or field on the left side of the molecule would reshape the electron density providing a different potential at the output which can be detected. This is an efficient way to transmit a signal. There is no need for electron transfer, just a charge reshape. If the excitation ceases, the shape comes back to its original form.

Figure 1:
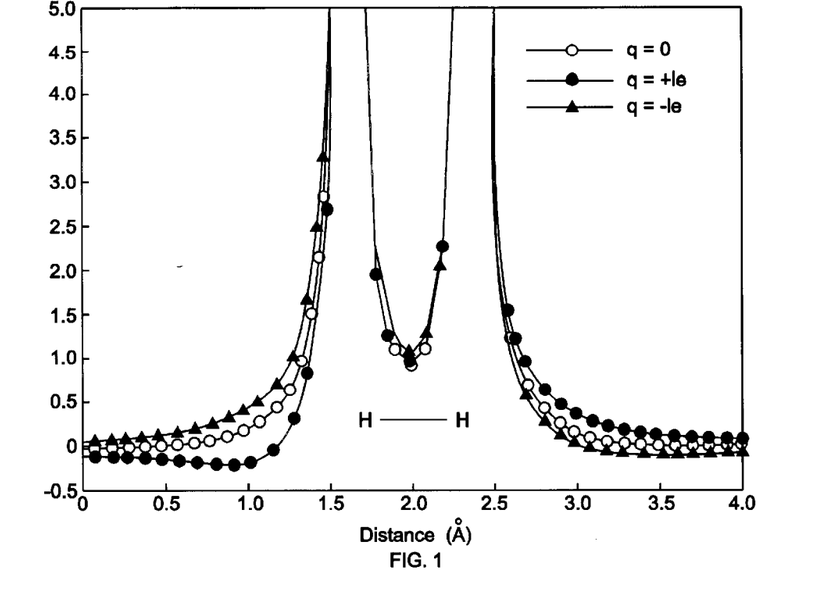
FIG. 1 is a graphical illustration of electrostatic potential in the vicinity of a hydrogen molecule with no additional charge present and with a slight negative and slight positive charge able to modify the molecular electrostatic potential.

FIG. 1 illustrates graphically the perturbation in the electrostatic potential about a hydrogen atom. A charge (positive and negative) is placed 2 Å from the center of an $H_2$ molecule along the bond axis. The electrostatic potential is calculated along the bond axis at varying distances. Notice that the electrostatic potential in the molecule is slightly perturbed due to the presence of the charge. The small variations of the electrostatic potential at the 3.5 to 4.0 Å distances would be used to transfer the information to the next molecule. The computational method used is described in the Theoretical Calculations section.

This method of information transfer is detectable although, as see in FIG. 1, the change in the electrostatic potential is minimal (~10 kcal/mole/electron where the formal units of electrostatic potential are energy per unit of charge). The change observed in the electrostatic potentials are in the range of values of non-bonded interactions, such as van der Waals interactions, which are easily detected by neighboring molecules. In fact, these are precisely the range of signal energies needed if we will ultimately utilize large scale integration in very small areas of materials. If the signals were large, problems of energy consumption and dissipation, as discussed above, rule out use of molecular based electronics. Thus the use of electrostatics directly addresses energy concerns in downsizing.

There are two types of gates. The present invention relates to one of them but not the other. These two types include input/output gates at the interface of the logical circuits and those in the CPU. The gates at the input interface would have to be able to take signals from standard electronic circuits, lasers, scanning probe microscopy (SPM) tips, or in general, from well-localized electrical fields. The gates perturb the electrostatic potential of the first molecule. This first molecule in turn perturbs the electrostatic potential of its immediate neighboring molecules. Those immediate neighboring molecules in turn perturb the electrostatic potential of their immediate and subsequent neighboring molecules, and so forth to the last molecule. Hence, a sequential perturbation of the electrostatic potential is achieved.

Molecular gates at the output would have to drive or inject a current onto a minuscule tip or metal cluster, or be able to excite the input of standard bulk devices. The vast majority of molecular gates, however, would be within the molecular CPU and would thus perform the information processing by controllably affecting the electrostatic potential of neighboring molecules. The compounds described here belong to the large group of gates that would allow the processing of information and the interconnection between them. The bulk/molecular interfacing structures are not being considered here, since they are already the subject of several publications and they are the focus of most molecular scale electronics research.

Following the philosophy of the theory of circuits, any molecular system can be represented by a pseudo active device E corresponding to the total energy of the molecule which keeps the molecule at its ground state, i.e., at its point of operation or quiescent point, and connected to another pseudo passive device. The wavefunction ($\Psi$) of the molecular device is given by the shape of the electron density. A quantity P is assigned to each molecule and is indicative of a molecular system's opposition to change the electrostatic potential in a defined region. This quantity P will be a better descriptor if the molecular circuit is designed to interact with others only through long range interactions. P is connected or directly related to the electron affinity and the chemical potential as well as polarizability and chemical hardness. P is also reminiscent of the impedance in electronic circuits and control theory, and in a practical way represents the transfer function of the device. This quantity would depend on the wave function in a molecule, a much more complicated entity than in control theory. Therefore P is a measure of the reluctance of the electron density at the boundaries of the molecule to reshape the form of the electrostatic potential when an excitation on another spatial part of the molecule is applied. However, P's direct relation to power, as in the standard impedance, is accepted. Thus, hereafter we refer to this molecular impedance as, simply, impedance P.

Specific Molecular Structures

Figure 6A:
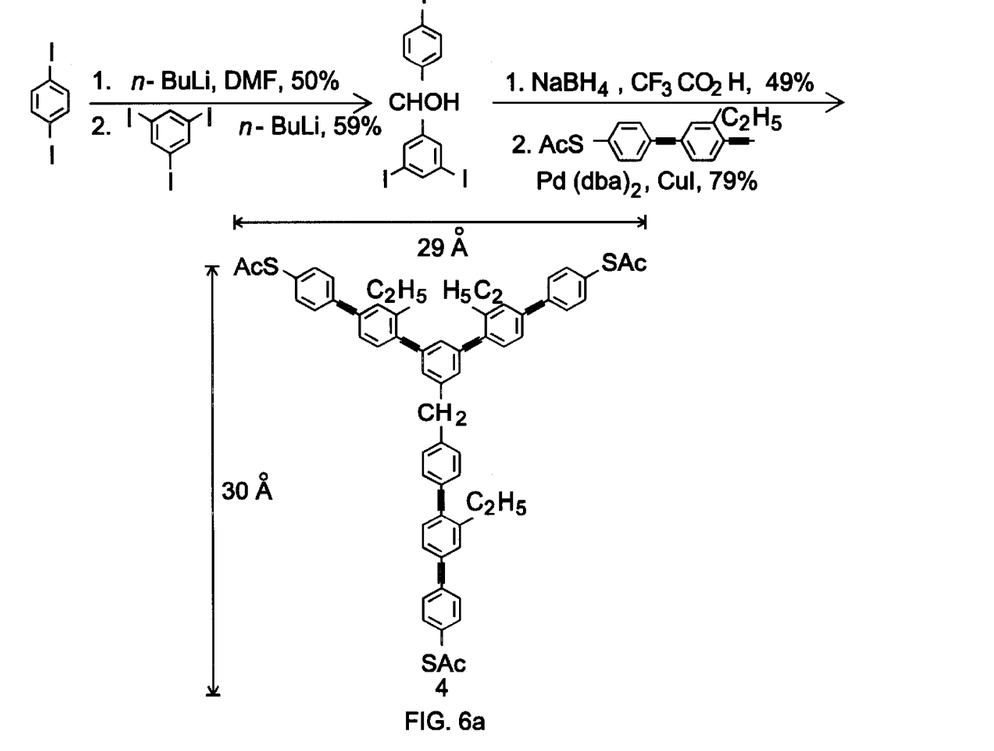
FIGS. 6A and 6B illustrate a molecular switch with characteristics of a transistor.
Figure 6B:
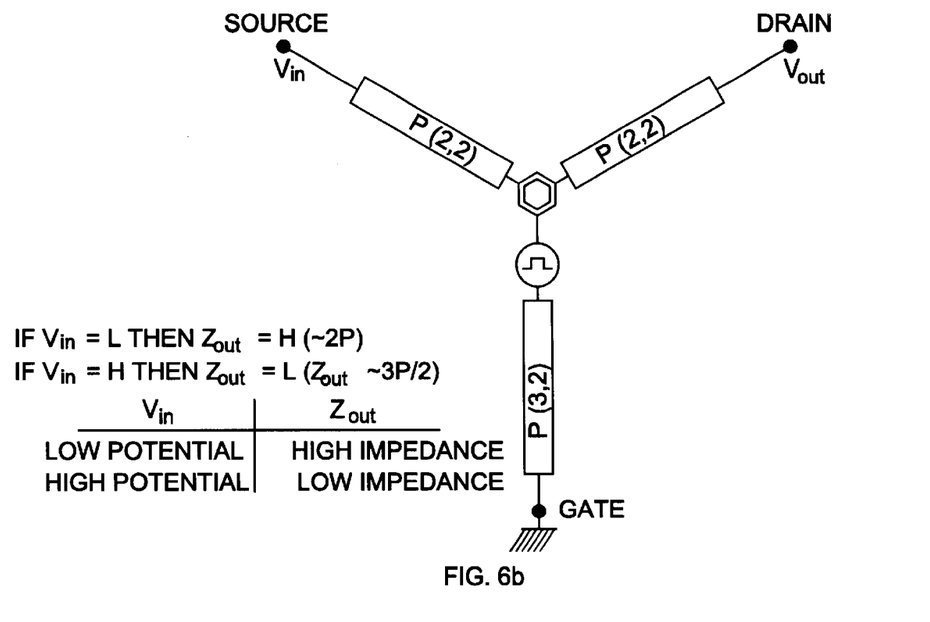
Figure 7A:
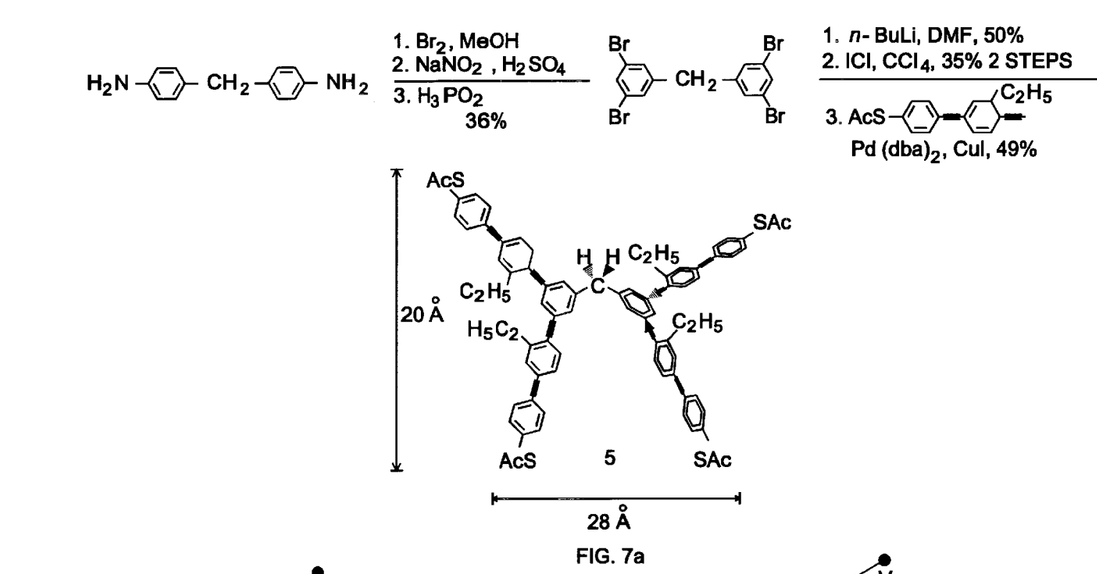
FIGS. 7A and 7B illustrate a molecular logic device.
Figure 7B:
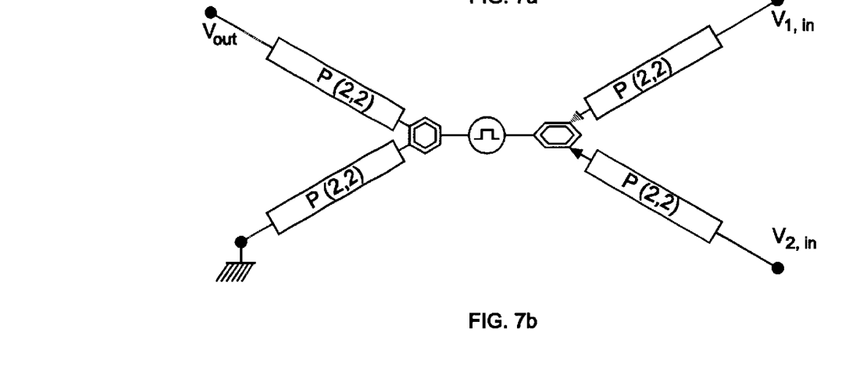

We present here several convergent synthetic routes to $\pi$-conjugated molecules with various potential electronic device applications including (1) a two-terminal molecular wire with a transport barrier (FIGS. 3A, 3B), (2) a molecular wire with two transport barriers that could result in negative differential resistance (NDR) (an example of a device that exhibits NDR includes a quantum well to serve as a resonant-tunneling diode (RTD)) (FIGS. 4A, 4B), (3) a three-terminal junction (FIGS. 5A, 5B), a three terminal system with switch-like possibilities (FIGS. 6A, 6B), and (4) four-terminal systems that could serve as logical gates without the use of multiple transistors (FIGS. 7A, 7B). In each case, the low P segments are based on $\pi$-conjugated oligo(phenylene ethynylene)s. The synthesis of the oligo (phenylene ethynylene) branching arms were described previously, and we attached them to the cores of the device structures here using Pd/Cu-catalyzed cross-coupling reactions; see, L. Jones et al, *Journal of Organic Chemistry*, Vol. 62, pp. 1388–1410 (1997). $\pi$-Conjugation can be constructed in a molecule by simply building an alternation of single and double or single and triple bonds or, more generally, any system that has a contiguous $\pi$-orbital overlap throughout the system. Thus, any $\pi$-conjugated system may be employed as the low P segments in the practice of the present invention, provided that the contiguous $\pi$-orbital segments are not restricted to reside near orthogonality. Orthogonal (or near orthogonal) $\pi$-orbital segments provide high P segments. The conversion of low P to high P when considering contiguous $\pi$-orbital containing structures proceeds as a function of $\cos^2 \theta$, where $\theta$ is the twist angle.

The high-P segments are based on methylene units, since SPM studies showed us that alkyl units pose larger electronic transport barriers (higher resistance for currents, which intuitively implies higher P for electrostatic potentials) than the $\pi$-conjugated moieties in single molecular systems; see, L. Bumm et al, *Science*, Vol. 271, pp. 1705–1707 (1996). The methylene units were either derived from readily available starting materials or they were made by aryllithium additions to aldehydes followed by the vigorous borohydride/trifluoroacetic acid (TFA)-induced reduction of the resulting bis(benzylic) alcohols; see, G.W. Gribble et al, *Tetrahedron Letters*, pp. 6023–6026 (1985). The ethyl groups impart solubility to the larger molecules so that synthetic manipulations and depositions can be freely executed in solution; see, L. Jones et al, *supra*. While methylene units are desirably employed in the practice of the present invention, other high-P segments may alternatively be employed, as discussed below in connection with the device illustrated in FIGS. 3A, 3B.

All of the final compounds described have termini bearing self-assembling moieties, namely acetyl-protected thiols to serve as protected "alligator clips" (molecular alligator clips), and we have previously described their preparation and utility; see, J.M. Tour et al, *Journal of the American Chemical Society*, Vol. 117, pp. 9529–9534 (1995) and D.L. Pearson et al, *Journal of Organic Chemistry*, Vol. 62, pp. 1376–1387 (1997). While thiols are desirably employed in the practice of the present invention, other molecular alligator clips may alternatively be employed, as discussed below.

The precise termini needed for the ultimate arrangement in a molecular-based CPU is, of course, not known; however, the capability of modern synthetic methods to construct precise molecular frameworks is exemplified and determinable by those skilled in the art without undue experimentation.

Figure 2:
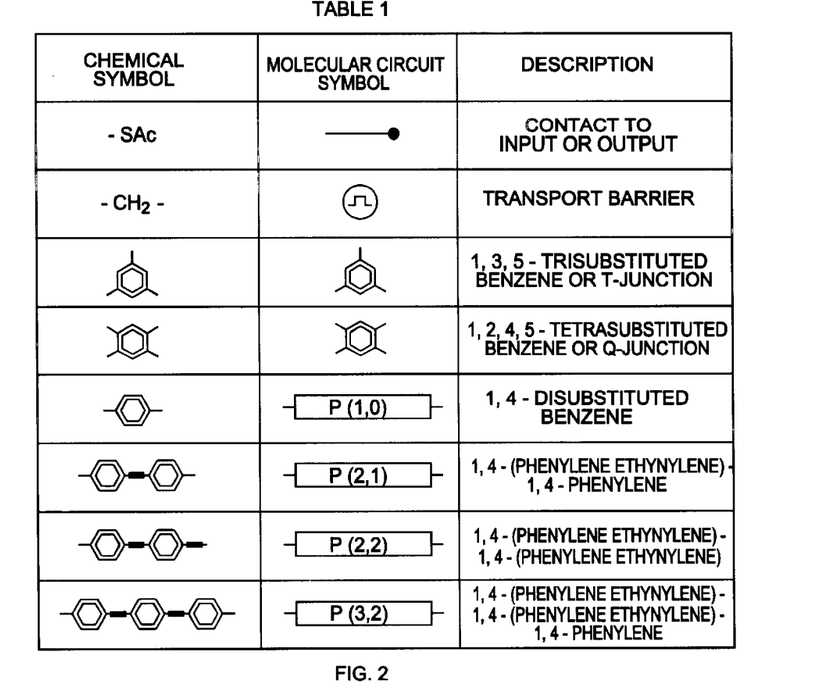
FIG. 2 is a table of chemical symbols and their corresponding molecular circuit symbols as employed herein.

For our specific molecules, P(m,n) refers to the molecular electrostatic potential impedance of a system with m 1,4-phenylene moieties and n ethynylene moieties. In order to have a preliminary idea of the qualitative form of the interactions using molecules designed and synthesized in our laboratory, the nomenclature in the Table of FIG. 2 has been adapted to aid in explaining the behavior of electronic circuits. The acetyl unit on the sulfur was affixed to provide stability, but it can be removed during the prearranging process. That sulfur group can be referred to as the molecular alligator clip mentioned above. Other molecular alligator clips can be considered; for example, instead of sulfur, one could use oxygen, selenium, phosphorus, isonitrile (C$\equiv$NR, where R is the molecular wire portion and C is the terminal atom), or carboxylate (–O$_2$CR).

Figure 3A:
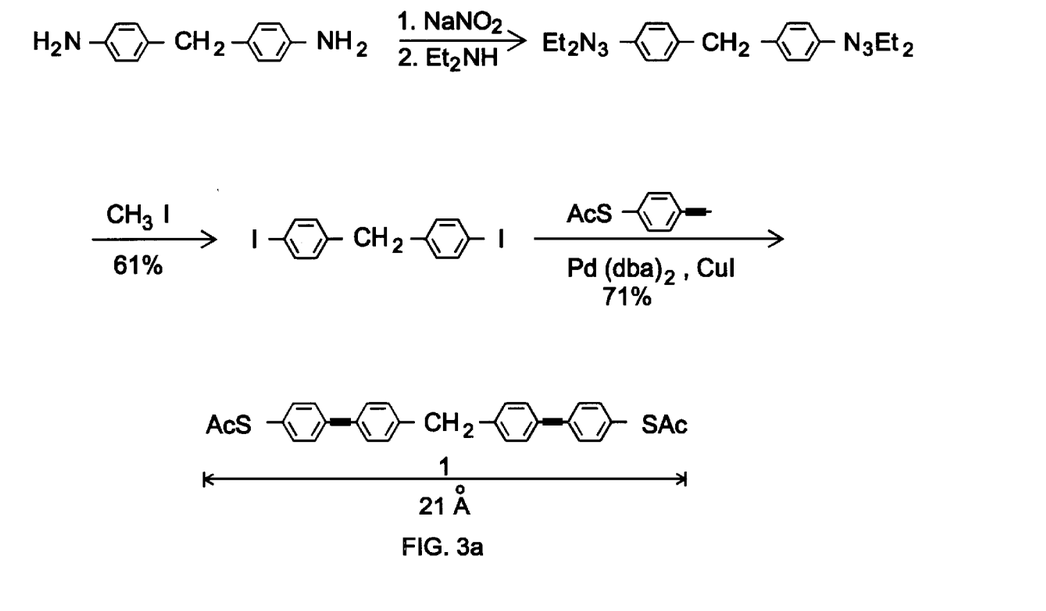
FIGS. 3A and 3B illustrate the synthesis of and chemical symbols for a molecular structure and its corresponding molecular circuit symbols (as defined in FIG. 2), that can function as a molecular wire with a transport barrier, respectively.
Figure 3B:
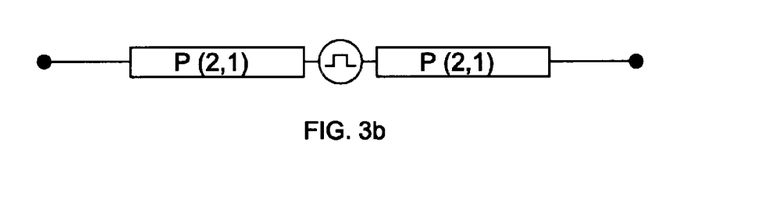

Compound 1, as illustrated in FIGS. 3A, 3B, is a molecular wire with a transport barrier. The transport barrier provides a higher value for the impedance P than the wire itself. The term "molecular wire" refers to the ability to make connections to other devices. Beyond that, no physical similarity to macroscopic wires is implied. An ideal wire has zero resistance, and practical wires normally have a resistance much smaller than 1$\Omega$; however, the resistance of molecular wires is likely considerably larger. Thus, as discussed above, in molecular scale electronics, we do not want to transport large numbers of electrons through the molecules, but simply to reshape the electron density in order to perform a logical function. Therefore, the applied potential between the sulfur terminals would determine the ability of the circuit embodied by compound 1 to reshape its electron density. Due to the methylene transport barrier in compound 1, it is proposed that the reshape of the electron density will be practically unnoticeable on the output end if the potential on the input end is relatively small. We show here the transport barrier based on a methylene group, but the barrier could be based on a number of different groups within the chain or at the terminal. For example, the methylene could be substituted with an ethylene (–CH$_2$CH$_2$–) group to serve as a larger transport barrier. Similarly, the transport barrier could be based on two non-planar aromatic units (the larger the twist angle, $\theta$, the larger the barrier) or heteroatomic units such as oxygen or nitrogen within the chain. Likewise, the transport barrier could be based upon a different heteroatom connection at the input or output leads, i.e., "alligator clip" location. In the present case, we are showing a sulfur connection point, but the barrier would undoubtedly change if the sulfur were substituted with a different element, as discussed above, such as selenium or isonitrile.

However, if the applied potential is above a threshold imposed by the methylene barrier, or any other elemental barrier, the electron density will reshape the electrostatic potential at the output end. With this simple structure, we could assess the barrier height imparted by a single methylene, the simplest alkylidene unit.

Figure 4A:
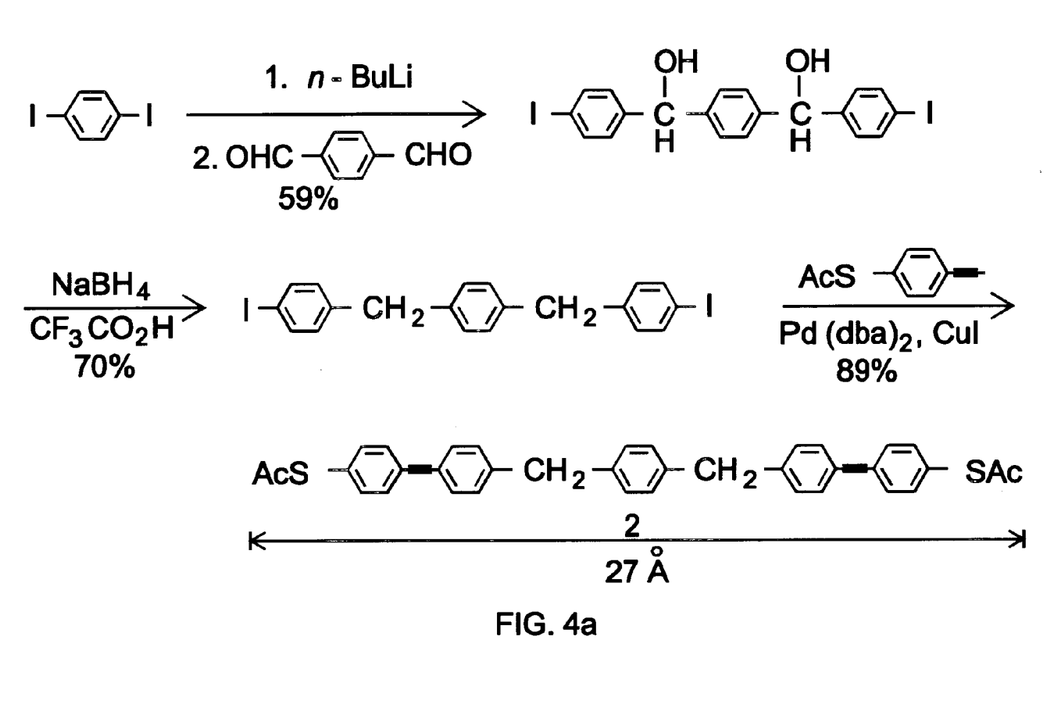
FIGS. 4A and 4B illustrate the synthesis of a molecular "wire" with two barriers in chemical symbols and circuit symbols.
Figure 4B:
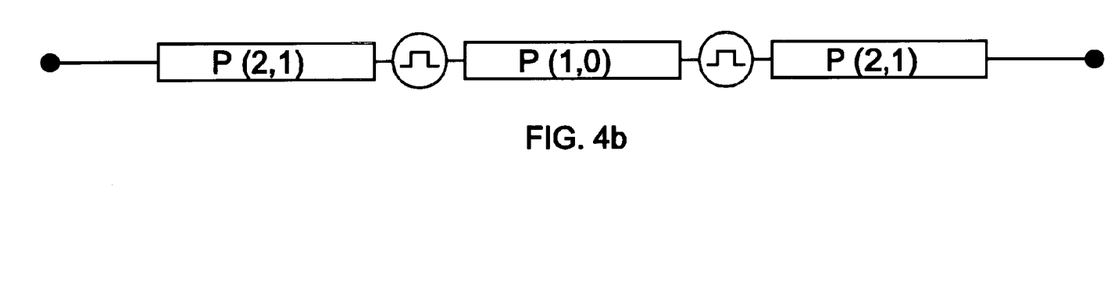
Figure 5A:
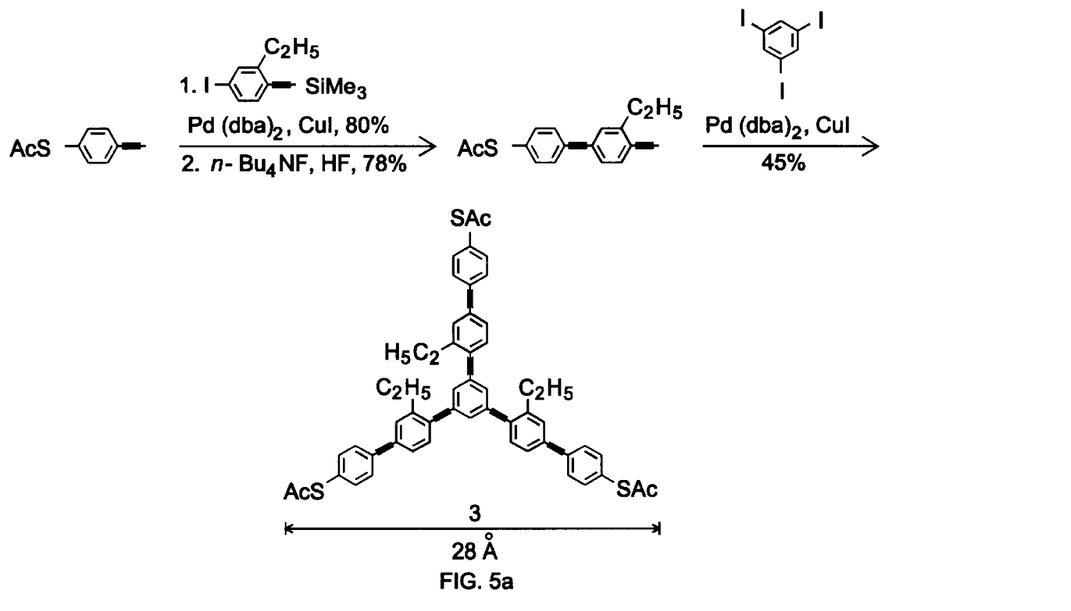
FIGS. 5A and 5B illustrate a three-terminal molecular junction.
Figure 5B:
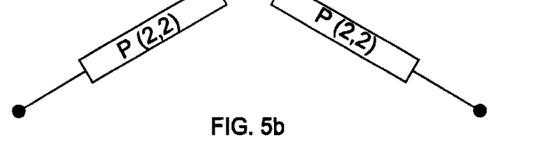

Compound 2, as seen in FIGS. 4A, 4B, is a more sophisticated device with two transport barriers which resembles a linear quantum dot or a resonant tunneling diode (RTD) while compound 3, as illustrated in FIGS. 5A, 5B, is a molecular three-terminal junction that could be used as a molecular interconnect. A common feature of logic circuits is that output from a gate is connected to two or more successive gates.

Compound 4, as seen in FIGS. 6A, 6B, is a molecular-sized switch where the corresponding equivalent of a source, drain and gate terminals of a bulk solid state FET are indicated. The operation of this device could be in the following manner: A low (L) input potential will not be easily transmitted through the barrier. For simplicity, we assume that P(2,2) is approximately equal to P(3,2) so both can be assigned the same value P. Understanding that all results are approximations, the impedance observed from the output will be equal to 2 P, reminiscent of two impedances connected in series. Conversely, if a high (H) input potential is applied such that the threshold imposed by the methylene barrier is exceeded, a further reshaping of the electron density is possible since an extra channel P(3,2) is available. Therefore the molecular impedance observed from the output will be smaller than when the input was low. This effect is qualitatively presented as having the input P(2,2) and the P(3,2) impedances in parallel, yielding an equivalent of ½ P to be added to the output P(2,2) affording a total of 3P/2. These two possible and well distinguishable values of impedances, which are controlled by the input potentials, permit this structure to have switch-like properties, and thus correspond to an active molecular scale electronic device with an inherent power supply (that maintains the device in its operation point but not as a power producing source). This specific configuration would behave as a NOT logic gate as suggested in the circuit diagrams and logic tables of FIG. 6B, and it outlines only one of the three possible configurations, similar to a bulk transistor's versatility. Though the impedance relationship between the two states in compound 4 is small when compared to present bulk devices, it is important to understand that these molecular devices are not used as amplifiers, but logical gates, where it is only necessary to distinguish between the low and high levels of potentials (similar to the 0 or 5 volts in some present circuits).

Figure 11A:
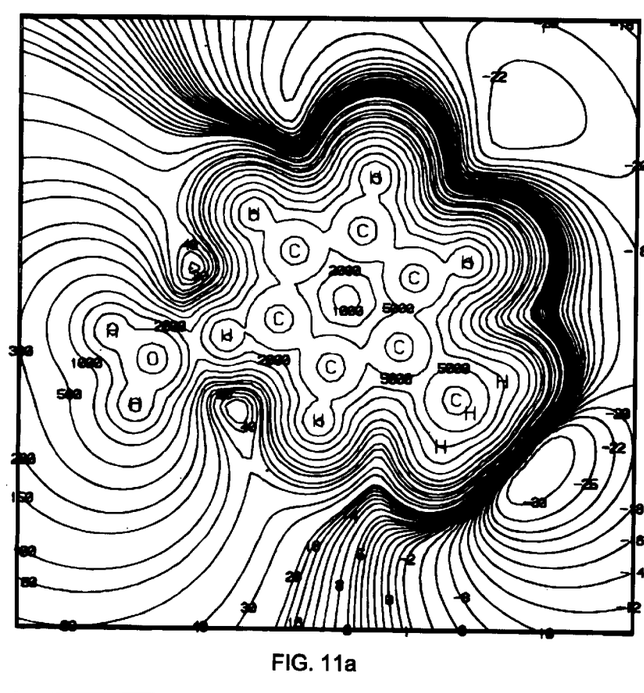
FIG. 11A illustrates the electrostatic potential contours of a toluene molecule (the core of FIG. 6B) acting as a switch.
Figure 11B:
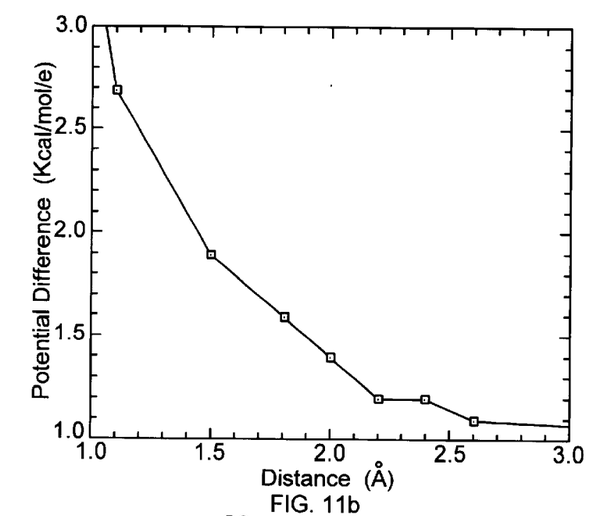
FIG. 11B illustrates a plot of the electrostatic potential between the carbon-5 position of toluene (C-1=methyl position or gate, C-3=input position or source, and C-5=output position or drain) and the methyl group (of FIG. 11A) at eight different input distances.

The switching properties of compound 4 (FIGS. 6A, 6B) are computationally simulated using toluene as the central core of switch compound 4 and using the oxygen atom of a water molecule as the region of approaching electrostatic potential. The electrostatic potential gradient is illustrated in FIG. 11A (one point), while the multiple points are listed in FIG. 11B. As the water molecule approaches (2.2 Å) the proton at toluene C3 (source), the electrostatic potentials were monitored at the C5 proton (drain) and the methyl protons (gate). As the input potential increases (at C3), the output potential (at C5) also increases with little potential change at the methyl protons (gate); therefore, the gate is "open". At a threshold input potential when the water molecule approaches C3 to within 2.2 Å, the methyl (gate) closes, producing a drop in the output potential. Plotted is the output transition at C5, with respect to the reference ($CH_3$), over a series of approaching water molecule distances. Notice the drop in the output as soon as the methyl (gate) closes due to the increase in the input.

Figure 8:
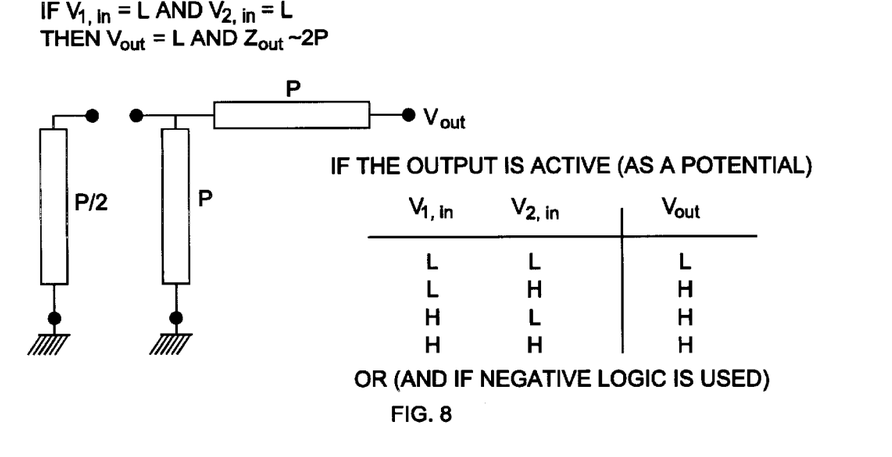
FIG. 8 illustrates a circuit diagram using the logic device of FIGS. 7A and 7B, along with the corresponding logic table.
Figure 9:
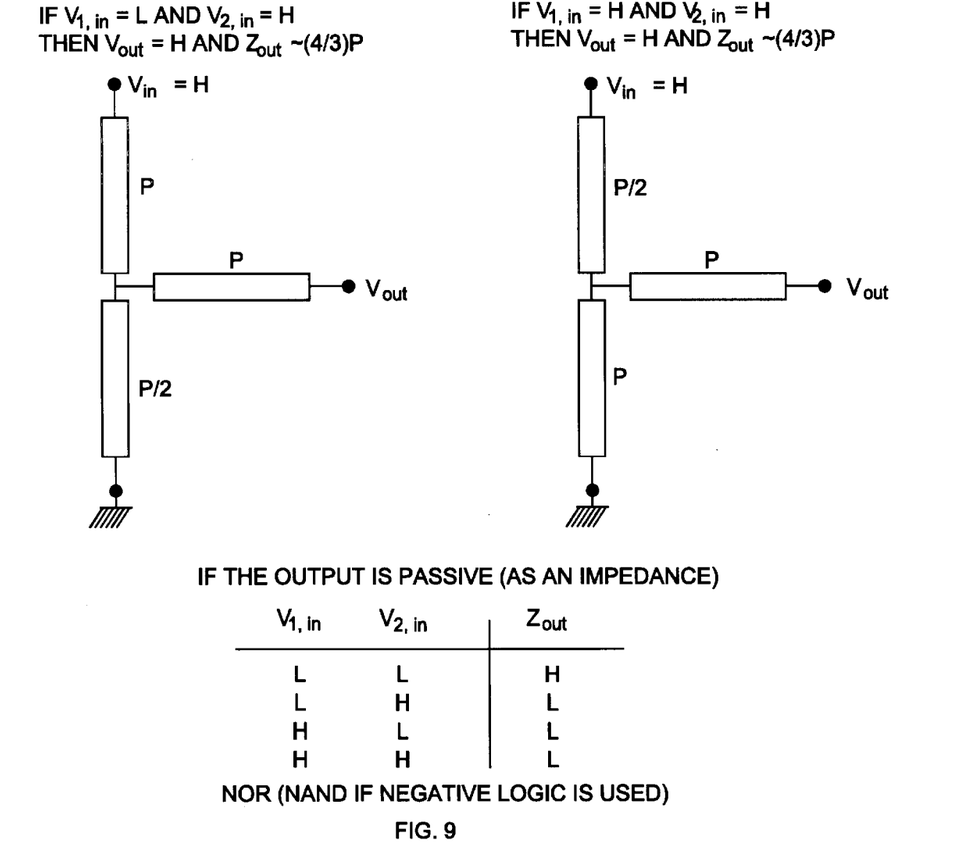
FIG. 9 illustrates an alternative, different circuit diagram in two embodiments using the logic device of FIGS. 7A and 7B along with the corresponding logic table.

Compound 5 could be viewed as a molecular logic device. The output would be the electrostatic potential and the levels of the electrostatic potential represents the binary information. This circuit can be analyzed by comparison to compound 4 by finding the output impedances (so the molecule is being used as a passive device) as shown in the accompanying circuit diagrams. Alternatively, we can calculate the approximate output potential (so the molecule is being used as an active device) using the same assumptions used for compound 4 and considering that the low potential L corresponds to a zero potential and that the high potential H corresponds to a positive potential $V_H$. As shown in FIGS. 8 and 9, compound 4 can be an active OR or a passive NOR gate if positive logic is used (L=0 and H=1). Conversely, compound 5 can be an AND or NAND gate, respectively, if negative logic is used (L=1 and H=0). This shows only one of the several possible configurations for this device.

Figure 12A:
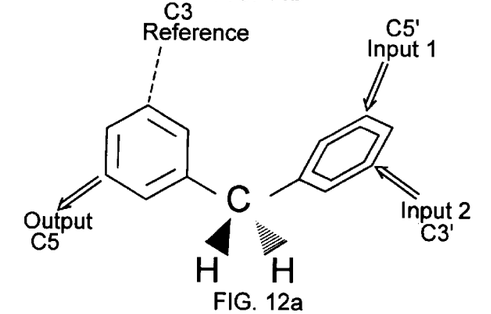
FIGS. 12A and 12B illustrate the electrostatic potential contours of a diphenyl-methane molecule (the core of FIG. 7B) acting as a logic device in both a two dimensional view and a one dimensional view with one and two water molecules approaching the diphenylmethane, wherein the negative portion of the molecular electrostatic potential of water is used here as input (although any external potential could be used)
Figure 12B:
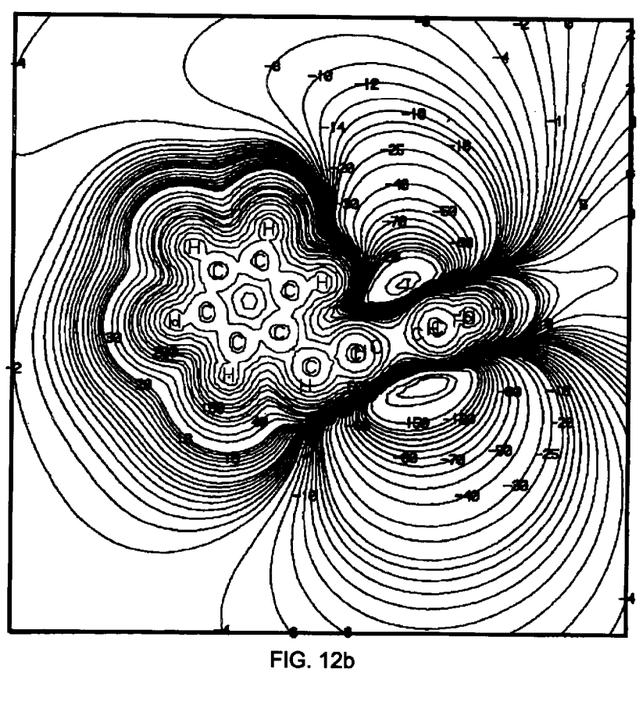

In FIG. 12, diphenylmethane served as the model system for the ab initio calculations of logic device-like properties of compound 5. The orientation of the diphenylmethane shows the minimized structural form where the two aryl rings are in orthogonal planes. The C3 diphenylmethane proton is reference or ground, the C5 proton is the output, and the C3 and C5 protons are inputs. The electrostatic potential of diphenylmethane wherein the negative electrostatic potential regions of the input phenyl ring (right) are seen because the input ring is perpendicular to the plane of the paper (as illustrated in FIGS. 7A, 7B). Also depicted is one water molecule approaching at 2.5 Å to the input proton at C3 (input=L, H) and it is able to induce an electrostatic potential output (H) at the C5 proton. A second water molecule approaching the C5 input proton (input=H, H) at 2.5 Å was calculated and it complements the output at the C5 proton. Therefore either one or two H inputs induces an output much greater than zero, namely H.

Figure 12C:
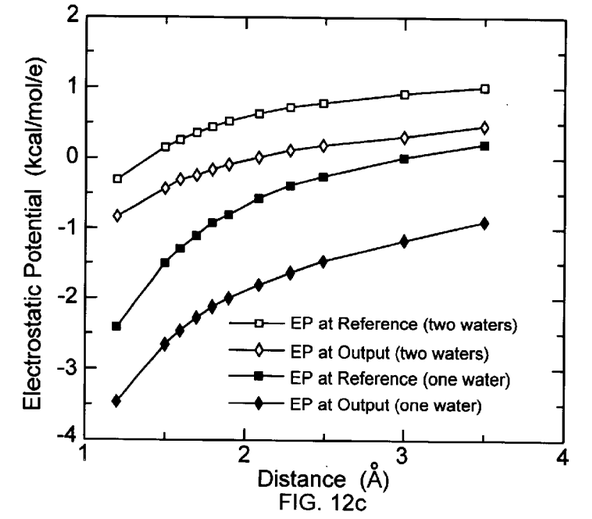
FIG. 12C is a plot of the data from eleven input distances with respect to the molecule represented in FIG. 12A.

FIG. 12C shows a plot of 11 input distances for both one and two water molecules approaching diphenylmethane. The electrostatic potential outputs are higher than the corresponding references when one or two H inputs are added, respectively.

Theoretical Calculations

One of the benefits of molecular electronic systems is the fact that they can be successfully guided by precise calculations. In this section we illustrate how the electrostatic potential of a molecule can be used as the carrier of digital information. The importance of this study focuses on the fact that molecules can be considered active electronic devices able to transfer the information from one molecule to another. The second goal of this section is to demonstrate that the electrostatic potential can also be used as a tool to perform logical operations. The third goal is to computationally demonstrate that the molecules we synthesized could perform the functions for which they were designed.

Specifically, we have used DFT (density functional theory) techniques since these are the most powerful tool to deal with a relatively large number of atoms; see, "Recent Developments and Applications of Modem Density Functional Theory", J.M. Seminario, ed., Elsevier, Amsterdam, p. 900 (1996). The use of DFT is fully justified due to the fact that it is an ab initio technique able to deal with a broad variety of systems. Several successful applications of DFT have been reported using the hybrid functionals where a portion of the exchange functional is calculated as a fully non-local functional of the wave function of an auxiliary non-interacting system of electrons. Since this resembles the exchange in the HF (Hartree-Fock) procedure (actually in any wave-function procedure), it is common to refer to this functional, or procedure, as a DFT-HF hybrid. However, we have to consider that the exchange is being calculated using a non-interactive wave function whose density, but not its wave function, corresponds to the real system. A detailed analysis and its theoretical rigor can be found in the technical literature; see, A. Görling et al, *Journal of Chemical Physics,* Vol. 106, pp. 2675–2680 (1997). The functional that we used is the B3PW91 with the triple splitted valence basis set 6–311 G** which includes polarization functions for all atoms; see, A.D. Becke, *Journal of Chemical Physics,* Vol. 98, pp. 1372–1377 (1993); J.P. Perdew et al, *Physical Review B,* Vol. 46, pp. 6671–6687 (1992); and J.P. Perdew et al, *Physical Review B,* Vol. 45, pp. 13244–13249 (1992). All calculations were performed using the Gaussian-94 program; see, M.J. Frisch et al, *Gaussian* 94, E.1 version, available from Gaussian, Inc., Pittsburgh, Pa. (1996). All geometry optimizations were performed via the Berny algorithm in redundant internal coordinates; see, J.B. Foresman, "Exploring Chemistry with Electronic Structure Methods", Gaussian, Inc., Pittsburgh, Pa. (1996). The thresholds for convergence were 0.00045 atomic units (au) and 0.0003 au for the maximum force and root mean square (RMS) force, respectively. The self consistency of the non-interactive wave function was performed with a requested convergence on the density matrix of $10^{-8}$, and $10^{-6}$ for the RMS and maximum density matrix error between iterations, respectively. These settings provide correct energies within the level of theory of, at least, five decimal figures, and geometries of approximately three decimal figures.

Figure 10:
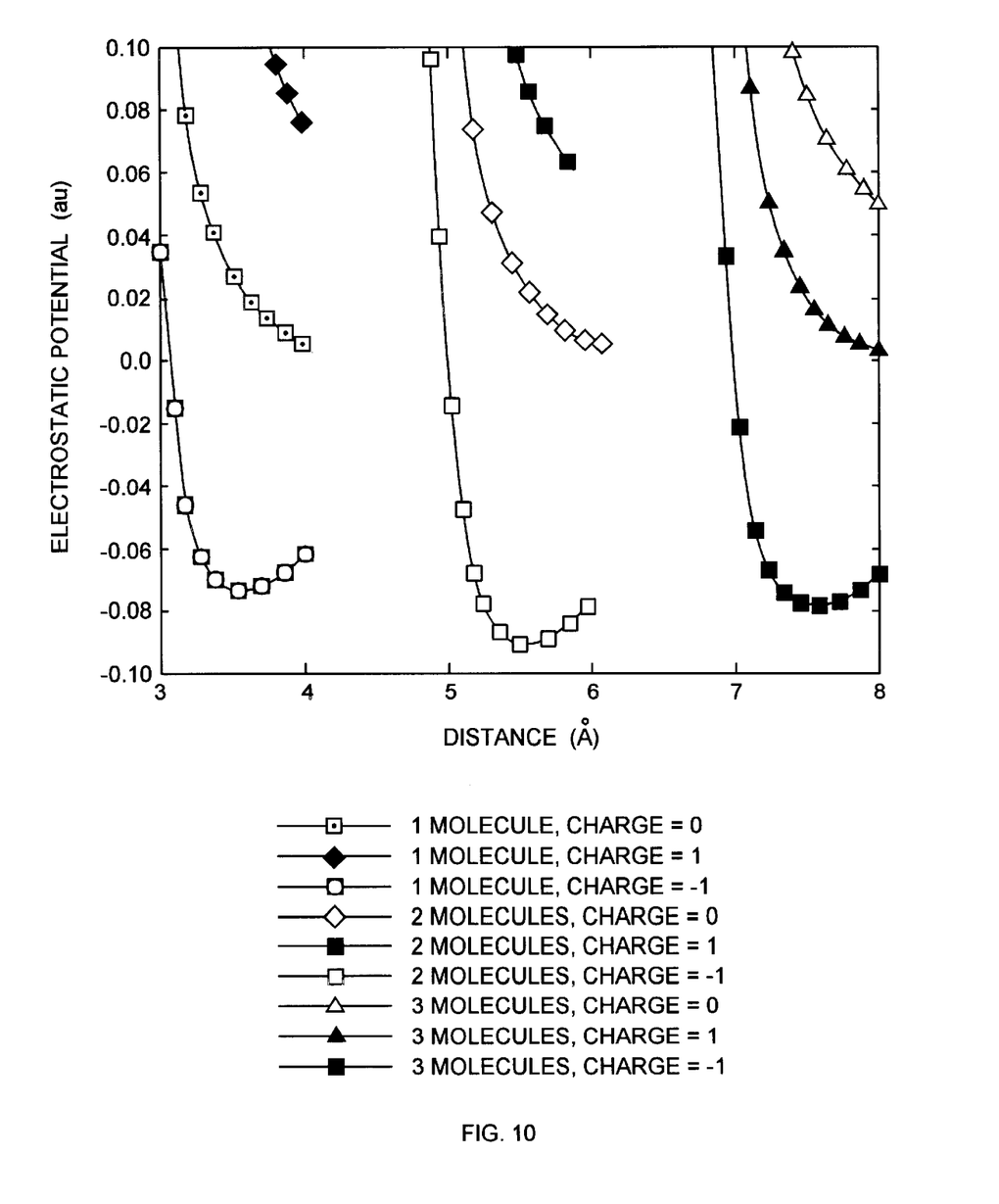
FIG. 10 is a graph of electrostatic potential of three spaced apart hydrogen molecules in series where a positive and a negative external potential has been applied.

The electrostatic potentials are well-proven tools for the study of molecular systems and utilizing these computational methods; see "Molecular Electrostatic Potentials: Concepts and Applications", P. Politzer et al, eds., Elsevier, Inc., pp. 649–660 (1996), and E. Scrocco et al, *Topics in Current Chemistry,* Vol. 42, pp. 95–170 (1973). FIG. 10 shows how the changes in electrostatic potential are transmitted from one molecule to another using an external potential. Although there may be decay of the electrostatic potential in some regions of space when transferring small portions of the electron density between molecules, there is always a corresponding electrostatic potential region that compensates for such a decay since the electrostatic potential depends directly on the electron density and the latter holds to an evident conservation law. In fact, as one region decreases, the electrostatic potentials conformably increase in other regions. Thus, their arrangements in a circuit can be exploited in order to obtain the best signal transfer. In addition, the natural decay on the electrostatic potential can be restored by connecting the part of the molecule producing the barrier between the input and output (the gate branch in compound 4) to a periodic external potential, via the underlying substrate; see, C.S. Lent et al, *Proceedings of IEEE,* Vol. 85, pp. 541–557 (1997). This would permit the barrier between the input and output states to be increased, thereby changing the input/output signals to specific relative values. Although this potential restoration would permit the long-range transfer of the signal, it would not suffer from the typical heat-dissipation problems that a current-based system would inflict.

Thus, there has been disclosed the use of molecular electrostatic potentials to process and communicate electronic signals within a molecular circuit. Logic-based molecular devices and a method for making the same are provided. It will be readily apparent to those skilled in this art that various changes and modifications of an obvious nature may be made, and all such changes and modifications are considered to fall within the scope of the present invention, as defined by the appended claims.

What is claimed is:

1. A molecular device comprising:
    (a) at least one input molecular unit;
    (b) at least one output molecular unit; and
    (c) at least one internal molecular unit for performing logic functions connected at one terminus to said input molecular unit and connected at another terminus to said output molecular unit, said logic function using molecular electrostatic potential and based on perturbing the electrostatic potential of a first molecule in a series of preselected and prearranged molecules, whereby the electrostatic potentials of each preselected molecule in said series of preselected and prearrange molecules is perturbed by the perturbation of a neighboring molecule's electrostatic potential.

2. The molecular device of claim 1 including a two-terminal molecular wire with a transport barrier.

3. The molecular device of claim 1 including a molecular wire with two transport barriers.

4. The molecular device of claim 1 including a three-terminal configuration.

5. The molecular device of claim 4 wherein one of said terminals has a transport barrier, thereby providing switch-like or transistor capabilities.

6. The molecular device of claim 1 including a four-terminal configuration that serves as a logic gate.

7. The molecular device of claim 6 wherein said molecular device includes a transport barrier.

8. The molecular device of claim 1 wherein said molecular device comprises at least one relatively high impedance molecular segment and at least one relatively low impedance molecular segment.

9. The molecular device of claim 8 wherein said at least one low impedance molecular segment consists essentially of π-conjugated segments.

10. The molecular device of claim 8 wherein said at least one high impedance molecular segment consists essentially of at least one unit selected from the group consisting of methylenes, ethylenes, heteroatoms, and non-planar aromatic units.

11. The molecular device of claim 10 wherein said at least one high impedance molecular segment is located at at least one of said input molecular unit, said output molecular unit, or said internal molecular unit.

12. The molecular device of claim 8 wherein said input terminal and said output terminal each consist essentially of molecular alligator clips which comprise moieties selected from the group consisting of sulfur, oxygen, selenium, phosphorus, isonitrile, and carboxylate.

13. A method for transporting signals and information using molecular electrostatic potential, said method comprising the steps of:
    (a) perturbing the electrostatic potential of a first molecule in a series of preselected and prearranged molecules, whereby the electrostatic potentials of each preselected molecule in said series of preselected and prearranged molecules is perturbed by the perturbation of a neighboring molecule's electrostatic potential; and (b) detecting the perturbation of the electrostatic potential of said last molecule in said series of molecules.

14. The method of claim 13 further comprising providing a molecular device comprising:
   (a) at least one input molecular unit;
   (b) at least one output molecular unit; and
   (c) at least one internal molecular unit for performing logic functions connected at one terminus to said input molecular unit and connected at another terminus to said output molecular unit, said logic function using said molecular electrostatic potential and based on perturbing the electrostatic potential of said neighboring molecule.

15. The method of claim 14 wherein said molecular device includes a two-terminal molecular wire with a transport barrier.

16. The method of claim 14 wherein said molecular device includes a molecular wire with two transport barriers.

17. The method of claim 14 wherein said molecular device includes a three-terminal configuration.

18. The method of claim 17 wherein one of said terminals has a transport barrier, thereby providing switch-like or transistor capabilities.

19. The method of claim 14 wherein said molecular device includes a four-terminal configuration that serves as a logic gate.

20. The method of claim 19 wherein said molecular device includes a transport barrier.

21. The method of claim 14 wherein said molecular device comprises at least one relatively high impedance molecular segment and at least one relatively low impedance molecular segment.

22. The method of claim 21 wherein said at least one low impedance molecular segment consists essentially of $\pi$-conjugated segments.

23. The method of claim 21 wherein said at least one high impedance molecular segment consists essentially of at least one unit selected from the group consisting of methylenes, ethylenes, heteroatoms, and non-planar aromatic units.

24. The method of claim 23 wherein said at least one high impedance molecular segment is located at at least one of said input molecular unit, said output molecular unit, or said internal molecular unit.

25. The method of claim 21 wherein said input terminal and said output terminal each consist essentially of molecular alligator clips which comprise moieties selected from the group consisting of sulfur, oxygen, selenium, phosphorus, isonitrile, and carboxylate.

* * * * *